(12) United States Patent
Taguchi et al.

(10) Patent No.: US 6,923,451 B2
(45) Date of Patent: Aug. 2, 2005

(54) TOOL HOLDER

(75) Inventors: Masahiro Taguchi, Osaka (JP); Yusaku Yamamoto, Osaka (JP); Eisaku Nakai, Osaka (JP)

(73) Assignee: Nikken Kosakusho Works Ltd., Osaka-Fu (JP)

( * ) Notice: Subject to any disclaimer, the term of this patent is extended or adjusted under 35 U.S.C. 154(b) by 113 days.

(21) Appl. No.: 10/391,917

(22) Filed: Mar. 19, 2003

(65) Prior Publication Data

US 2004/0164502 A1 Aug. 26, 2004

(30) Foreign Application Priority Data

Feb. 24, 2003 (JP) ........................................ 2003-045553

(51) Int. Cl.[7] .............................................. B23B 31/20
(52) U.S. Cl. .............................. 279/42; 279/48; 279/52
(58) Field of Search ....................... 279/42, 43.9, 46.9, 279/48, 51, 52, 56

(56) References Cited

U.S. PATENT DOCUMENTS

| 3,136,561 A | 6/1964 | McAuliffe et al. ............... 279/9 |
| 3,332,693 A | * 7/1967 | Armstrong et al. ............. 279/47 |
| 3,365,204 A | * 1/1968 | Benjamin et al. .............. 279/51 |
| 3,554,080 A | 1/1971 | Herrmann ....................... 90/11 |

(Continued)

FOREIGN PATENT DOCUMENTS

| DE | 3938689 A1 | * 5/1991 | ........... B23B/31/20 |
| DE | 4209485 A1 | * 1/1993 | ........... B23B/31/20 |
| JP | 46-062467 | 7/1971 | |
| JP | 49-125972 | 12/1974 | |

(Continued)

Primary Examiner—Derris H. Banks
Assistant Examiner—Michael W. Talbot
(74) Attorney, Agent, or Firm—Ladas & Parry LLP

(57) ABSTRACT

In order to provide a tool holder which greatly reduces frictional resistance between a locknut and a taper collet, and eliminates a twisting of the taper collet during tightening of the locknut, in a tool holder comprising a locknut 13 which pushes a taper collet 12 into a tapered hole 115 of a collet chuck body 11 to chuck a cutting tool 15, between a reference end 123 of the tape collet 12 and a collet supporting portion 131 opposed thereto, interposed is a bearing washer 14 to reduce frictional resistance between both contact surfaces. To both surfaces of this bearing washer 14, namely, to the respective surfaces which come into contact with the reference end 123 and collet supporting portion 131, surface treatment by any of ion nitriding, DLC (Diamond-Like Carbon) coating, and TiN coating is applied.

33 Claims, 5 Drawing Sheets

U.S. PATENT DOCUMENTS

| | | | | |
|---|---|---|---|---|
| 3,652,100 A | * | 3/1972 | Baturka | 279/51 |
| 3,719,367 A | * | 3/1973 | Baturka | 279/145 |
| 3,726,532 A | * | 4/1973 | Zeilinger | 279/52 |
| 3,815,930 A | | 6/1974 | Mattes | 279/50 |
| 3,905,609 A | * | 9/1975 | Sussman | 279/20 |
| 4,499,800 A | | 2/1985 | Stahl | 82/36 R |
| 4,621,960 A | | 11/1986 | Töllner | 409/232 |
| 4,657,454 A | | 4/1987 | Migita et al. | 409/234 |
| 4,673,319 A | | 6/1987 | Ishikawa | 409/234 |
| 4,699,388 A | * | 10/1987 | Sproccati et al. | 279/48 |
| 4,714,389 A | | 12/1987 | Johne | 409/233 |
| 4,817,972 A | * | 4/1989 | Kubo | 279/42 |
| 4,840,520 A | | 6/1989 | Pfalzgraf | 409/232 |
| 4,886,402 A | | 12/1989 | Pfalzgraf | 409/234 |
| 4,958,968 A | | 9/1990 | von Haas et al. | 409/232 |
| 5,167,476 A | * | 12/1992 | Lafferty et al. | 408/240 |
| 5,265,990 A | | 11/1993 | Kuban | 409/232 |
| 5,314,198 A | * | 5/1994 | Kanaan | 279/133 |
| 5,340,127 A | * | 8/1994 | Martin | 279/20 |
| 5,352,073 A | | 10/1994 | Kitaguchi | 409/232 |
| 5,522,605 A | * | 6/1996 | Lewis et al. | 279/49 |
| 5,567,093 A | * | 10/1996 | Richmond | 409/136 |
| 5,593,258 A | | 1/1997 | Matsumoto et al. | 409/234 |
| 5,716,173 A | | 2/1998 | Matsumoto | 408/239 A |
| 5,957,467 A | * | 9/1999 | Hornung | 279/49 |
| 5,957,636 A | * | 9/1999 | Boisvert | 409/131 |
| 5,964,556 A | | 10/1999 | Toyomoto | 409/234 |
| 5,984,595 A | * | 11/1999 | Mizoguchi | 408/57 |
| 6,071,219 A | | 6/2000 | Cook | 483/1 |
| 6,109,842 A | | 8/2000 | Cook | 409/1 |
| 6,209,886 B1 | * | 4/2001 | Estes et al. | 279/50 |
| 6,231,282 B1 | | 5/2001 | Yoneyama et al. | 409/234 |
| 6,352,395 B1 | | 3/2002 | Matsumoto et al. | 409/234 |
| 6,371,705 B1 | * | 4/2002 | Gaudreau | 409/234 |

FOREIGN PATENT DOCUMENTS

| | | |
|---|---|---|
| JP | 53-008949 | 4/1978 |
| JP | 58-094946 | 6/1983 |
| JP | 63-091335 | 6/1988 |
| JP | 01-246006 | 10/1989 |
| JP | 2512454 | 9/1991 |
| JP | 05-177419 | 7/1993 |
| JP | 06-015947 | 3/1994 |
| JP | 06-114612 | 4/1994 |
| JP | 08-108302 | 4/1996 |
| JP | 08-174374 | 7/1996 |
| JP | 09-290302 | 11/1997 |
| JP | 2000-263361 | 9/2000 |

* cited by examiner

TOOL HOLDER

BACKGROUND OF THE INVENTION

1. Field of the Invention

The present invention relates to a tool holder which grasps and holds a cutting tool such as a drill in a collet chuck by a slotted taper collet and a locknut, and more particularly, it relates to a tool holder in which a contact part between a locknut and a taper collet is coupled via a bearing washer.

2. Description of the Prior Art

In terms of a conventional tool holder of this type, in order to grasp and hold a cutting tool such as a drill in a collet chuck body by a slotted taper collet and a locknut, a coupling groove is formed in a ring shape around the entire outer circumference of a cutting tool inserting-side end portion of the taper collet, a convex thread portion to be engaged with the coupling groove is provided in a ring shape on the inner circumference of the locknut, and this convex thread portion is engaged with the coupling groove, whereby the taper collet is coupled to the locknut so as to be relatively rotatable.

Next, the taper collet in a coupled condition is inserted into a tapered hole provided on the inner circumference of the front-end portion of the collet chuck body and the locknut is screwed with a male screw portion provided on the outer circumference of the front-end portion of the collet chuck, whereby the taper collet is temporarily attached by insertion in the collet chuck body. Then, by tightening the locknut after inserting a shank portion of the cutting tool into a tool insertion hole, the taper collet is pushed into the tapered hole of the collet chuck body and is reduced in its diameter, whereby the cutting tool is held in the collet chuck body (See Non-patent literature 1, for example).

[Non-Patent Literature 1]

"Technical skill box 19: Usage of working tools, collet chuck structure" published by Taiga Shuppan, Jan. 1, 1975, pp. 22–23.

However, in such a conventional tool holder as described above, since the convex thread portion of the locknut is directly engaged with the coupling groove of the taper collet, when the tapered portion of the taper collet is pushed into the tapered hole of the collet chuck body by screwing the locknut with the male screw portion of the collet chuck body and tightening the same, press force to the tapered collet is biased due to surface roughness and friction, etc., between the contact surfaces of the mutually engaged ring-like coupling groove and ring-like convex thread portion, and moreover, torsional force due to a rotation of the locknut is transmitted to the taper collet. Due to this biased press force, the tapered portion of the taper collet may be pushed into the tapered hole of the collet chuck body in an inclining manner, and this phenomenon becomes noticeable as the collet becomes smaller in size.

In addition, if the taper collet is chucked in the collet chuck body in an inclined manner, a rotation run-out occurs at the cutting tool grasped and held in the taper collet, therein exists a problem such that a harmful influence is exerted to the workpiece cutting work.

In addition, as a result of the torsional force transmission to the taper collet, the taper collet grabs and supports the cutting tool in a twisted condition, therein exists a problem such that chucking of the cutting tool is hindered.

SUMMARY OF THE INVENTION

The present invention has been made for solving such problems as described above, and it is an object of the present invention to provide a tool holder which greatly reduces frictional resistance between a locknut and a taper collet, unifies press force to the taper collet by tightening of the locknut, and eliminates a twisting of the taper collet during tightening of the locknut.

In order to achieve the above object, according to the first aspect of the present invention, a tool holder comprises: a collet chuck body; a slotted taper collet to be fitted in a tapered hole formed in the front-end portion of the collet chunk body; a locknut which is screwed with a male screw portion formed on the outer circumference of the front-end portion of the collet chuck body and which holds cutting tool by inserting the taper collet into the tapered hole, wherein the taper collet has, at the front end of the cutting tool inserting side thereof, a reference end perpendicular to the axis line of the taper collet and a cylindrical nut engaging portion protruded from the reference end with its axis line aligned, the locknut has a collet supporting portion formed in a manner protruded in the center direction of the locknut so as to be opposed to the reference end and an insertion hole concentrically formed in the center of the collet supporting portion so as to allow an insertion of the nut engaging portion, the taper collet has a brim portion which is formed on the outer circumference of the front end of the nut engaging portion inserted through the insertion hole and which couples, by latching with the marginal rim of the insertion hole, the taper collet to the locknut so as to be relatively rotatable, a metal ring plate-like bearing washer is interposed between the reference end and the collet supporting portion opposed thereto, and to at least one surface of the bearing washer which comes into contact with the reference end and the collet supporting portion, surface treatment to reduce frictional resistance between both contact surfaces is applied.

As has been described in the above, according to the tool holder of the present invention, since a bearing washer which has received surface treatment by any of ion nitriding, DLC coating, TiN coating, and mirror-surface lapping is interposed between the reference end on the cutting tool inserting side of the taper collet and collet supporting portion of the locknut, frictional resistance between the mutual contact surfaces can be greatly reduced. Consequently, the press force into the taper collet by tightening of the locknut can be unified, and the taper collet can be securely pushed without inclination into the tapered hole in a manner following a taper of the tapered hole. Thereby, effects are provided such that, a tool can be held in the collet chuck body without inclining the taper collet, rotation run-out of the cutting tool grasped and held by the taper collet can be eliminated, and the tool holder becomes preferable as a tool holder using a small-sized collet.

In addition, according to the tool holder of the present invention, since a bearing washer which has received surface treatment by any of ion nitriding, DLC coating, TiN coating, and mirror-surface lapping is interposed between the reference end of the taper collet and collet supporting portion of the locknut, twisting of the taper collet during tightening of the locknut is eliminated, whereby the run-out accuracy of the taper collet can further be improved.

In addition, according to another aspect of the present invention, the bearing washer inserted in the ring-like supporting groove is held in the locknut by a snap ring disengageably attached by insertion in the engaging groove, therefore, an attachment of the bearing washer to the inside of the locknut and a detachment of the bearing washer from the locknut can be easily carried out.

In addition, according to yet another aspect of the present invention, since the surface of the collet supporting portion of the locknut with which the bearing washer comes in contact is formed in an arc surface protruded in an convex shape, the contact area between the bearing washer and collet supporting portion is reduced, whereby the frictional resistance between the bearing washer and collet supporting portion can further be reduced.

In addition, according to another aspect of the present invention, since the bearing washer can be held in the locknut by disengageably engaging the plurality of projections provided in a protruded manner on the margin of the bearing washer with the holding groove, an attachment of the locknut to the inside of the locknut and a detachment of the bearing washer from the locknut can be easily carried out.

In addition, according to yet another aspect of the present invention, since the bearing washer can be held in the locknut by disengageably engaging the marginal portion of the bearing washer with the plurality of holding projections formed with a ring-like layout on the inner circumferential surface of the locknut, an attachment of the bearing washer to the inside of the locknut and a detachment of the bearing washer from the locknut can be easily carried out.

In addition, according to still yet another aspect of the present invention, since the slot for a diameter reduction is formed in the radial direction in the bearing washer, the bearing washer can be easily attached to the locknut.

DESCRIPTION OF THE PREFERRED EMBODIMENTS

Hereinafter, embodiments of the present invention will be described with reference to the drawings.

Figure 1:
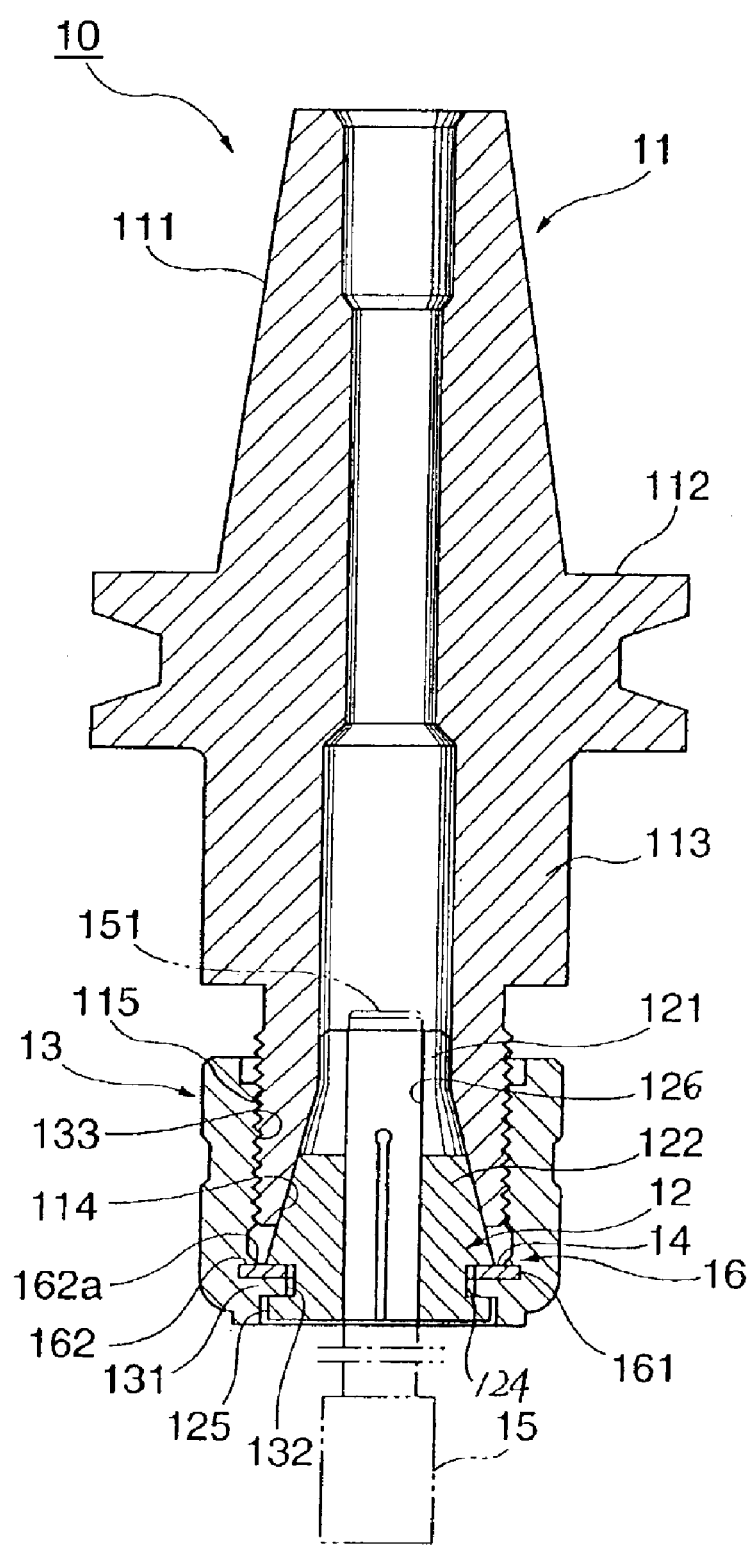
FIG. 1 is a longitudinal sectional view showing an assembled condition of a tool holder according to an embodiment of the present invention.
Figure 2A:
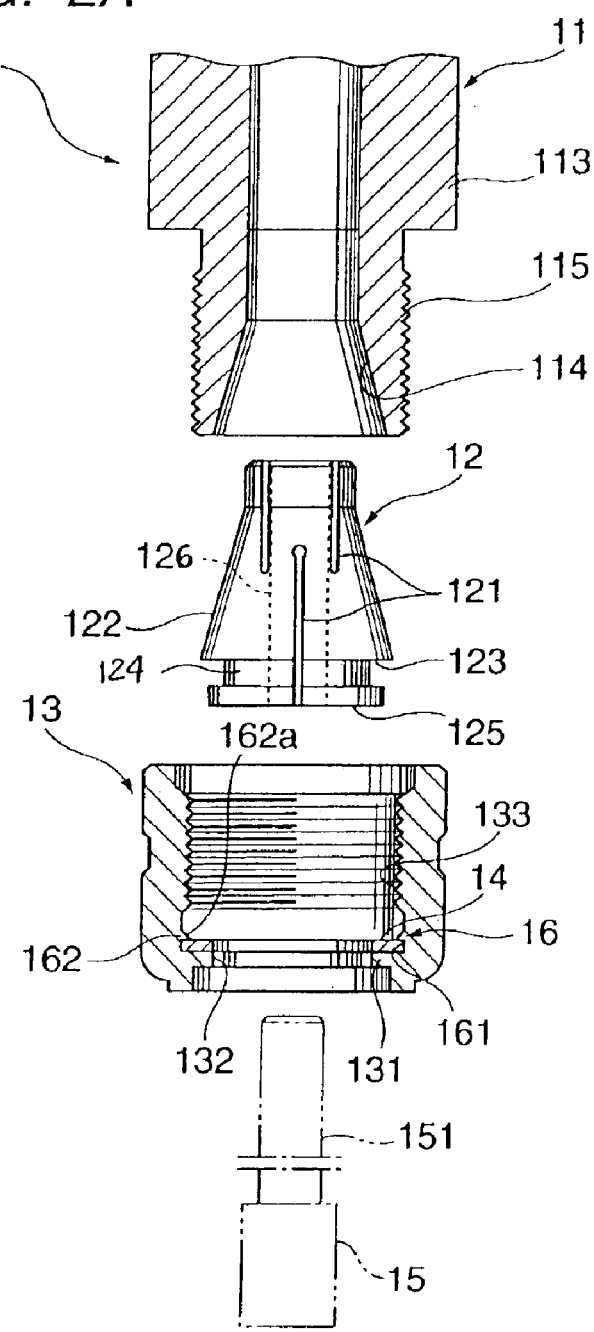
FIG. 2A is a sectional view showing the tool holder according to a first embodiment of the present invention in an exploded manner.
Figure 2B:
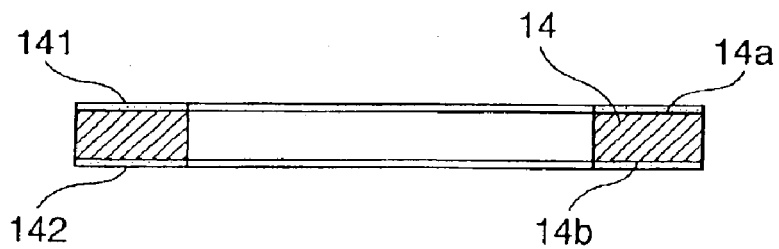
FIG. 2B is an enlarged sectional view of a bearing washer.

FIG. 1 is a longitudinal sectional view showing an assembled condition of a tool holder according to a first embodiment of the present invention, FIG. 2A is a sectional view showing the tool holder according to the first embodiment of the present invention in an exploded manner, and FIG. 2B is an enlarged sectional view of a bearing washer.

In FIG. 1 and FIG. 2A, a tool holder 10 comprises a collet chuck body 11 whose central axis part is hollow, a taper collet 12 with slots 121 to enable a diameter reduction, a locknut 13 to hold a cutting tool 15 such as a drill via the taper collet 12, and a metal bearing washer 14.

The collet chuck body 11 is to be attached by insertion in a main spindle of a machine tool (unillustrated), and this collet chuck body 11 has, as shown in FIG. 1 and FIG. 2A, a taper shank portion 111 whose diameter is gradually reduced from the front-end side to the rear end; a grasping and holding flange portion 112 formed at a large-diametrical end portion of the taper shank portion 111; and a cylindrical cutting tool attaching portion 113 extended from the end face of a counter-taper shank portion side of the flange 112 in the direction opposite to the taper shank portion 112 with its axis line aligned, and a tapered hole 114 whose diameter is gradually reduced from the front end to the rear end is formed at a forward part of the inner circumference of the cutting tool attaching portion 113. In addition, a male screw portion 115 with which a locknut 13 is to be screwed is formed on the outer circumferential surface of the cutting tool attaching portion 113.

The taper collet 12 is for attaching the cutting tool 15 to the collet chuck 11 by closely fitting the same in the tapered hole 114 of the collet chuck 11, and this taper collet 12 has, as shown in FIG. 1 and FIG. 2A, a tapered portion 122 which is fitted in the tapered hole 114 of the collet chuck body 11 and whose diameter is gradually reduced from the front end to the rear end; at the front end of the cutting tool 15 inserting side of the large-diametrical end face of the tapered portion 122, a reference end 123 which is perpendicular to the axis line of the taper collet 12; and a cylindrical nut engaging portion 124 protruded from this reference end 123 with its axis line aligned.

This taper collet 12 is designed to grasp and hold a cutting tool when the taper collet 12 is pushed into the tapered hole 114 by screwing and tightening the locknut 13 with the male screw portion 115 formed on the outer circumference of the front-end portion of the cutting tool attaching portion 113.

The locknut 13 has, as shown in FIG. 1 and FIG. 2A, a collet supporting portion 131 formed such that it protrudes in the center direction of the locknut 13 so as to be opposed against the reference end 123 of the taper collet 12; and an insertion hole 132 is concentrically formed at the center of the collet supporting portion 131 so as to allow an insertion of the nut engaging portion 124.

In addition, the taper collet 12 has a brim portion 125 which is formed on the outer circumference of the front end of the nut engaging portion 124 inserted through the insertion hole 132 and which couples, by being latched with the marginal rim of the insertion hole 132, the taper collet 12 to the locknut 13 so as to be relatively rotatable.

The bearing washer 14 is interposed between the reference end 123 and the collet supporting portion 131 opposed thereto for reducing frictional resistance between both contact surfaces and defines a ring plate having an outside diameter corresponding to the inner circumferential diameter of the locknut 13, and both surfaces 14a and 14b (see FIG. 2b) of this bearing washer 14, namely, the respective surfaces which come in contact with the reference end 123 and the collet supporting portion 131 are provided with low-friction processed layers 141 and 142 by any of ion nitriding, DLC (Diamond-Like Carbon) coating, TiN coating process, and mirror-surface lapping.

In addition, such a bearing washer 14 is detachably supported in the locknut 13 by a holding means 16.

The holding means 16 has, as shown in FIG. 1 and FIG. 2A, a ring-like holding groove 161 formed on the inner circumferential surface of the locknut 13 so as to hold the bearing washer 14 in contact with the collet supporting portion 131, and this holding groove 161 is constructed by a convex thread portion 162 formed in a ring shape, on the inner circumferential surface of the locknut 13, at an appointed distance corresponding to the thickness of the bearing washer 14 from the collet supporting portion 131, and a counter-collet supporting portion side surface 162a of this convex thread portion 162 is inclined so that the thickness of the convex thread portion 162 is gradually reduced from the inner circumferential surface of the locknut 13 toward the center direction.

The reason that the inclined surface 162a is provided in the convex thread portion 162 is to ease insertion into the holding groove 161 when the outer circumferential rim of the bearing washer 14 is engaged with the holding groove 161 of the locknut 13.

In terms of the tool holder 10 constructed as above, for chucking the cutting tool 15 in the collet chuck body 11, by, first, inserting one end portion of the bearing washer 14 in the holding groove 161 of the locknut 13 from the convex thread portion 162 side, then pushing the other end portion of the bearing washer 14 against the inclined surface of the convex thread portion 162 and inserting the same in the holding groove 161, the bearing washer 14 is fitted to the locknut 13. Then, the taper collet 12 is, from its nut latching portion 124 side, inserted into the locknut 13, and the brim portion 125 including the nut latching portion 124 is, with a reduced diameter, inserted through the insertion hole 132 of the locknut 13. Thereafter, by restoring the brim portion 125 including the nut latching portion 124 to its original state, the taper collet 12 is connected to the locknut 13 so as to be relatively rotatable.

Then, after inserting the tapered portion 122 of the taper collet 12 into the tapered hole 114 of the collet chuck body 11, the taper collet 12 is temporarily tightened to the collet chuck 11 by screwing a female screw portion 133 of the locknut 13 with the male screw portion 115 of the collet chuck body 11. Then, after inserting a shank portion 151 of the cutting tool 15 into a tool insertion hole 126 of the taper collet 12, the locknut 13 is completely tightened. Thereby, the tapered portion 122 of the taper collet 12 is pushed into the tapered hole 114 of the collet chuck body 11 and is reduced in diameter, and thereby holds the cutting tool 15 in the collet chuck body 11.

At this time, as shown in FIG. 1, the bearing washer 14 is interposed between the reference end 123 of the taper collet 12 and the collet supporting portion 131 of the locknut 13, and moreover, on both surfaces 14a and 14b of the bearing washer 14 which come in contact with the reference end 123 and the collet supporting portion 131, formed are the low-friction processed layers 141 and 142, which have received surface treatment to reduce frictional resistance by any of ion nitriding, DLC (Diamond-Like Carbon) coating, and TiN coating, and therefore, the frictional resistance between the contact surfaces can be greatly reduced. Accordingly, the press force to the taper collet 12 by tightening the locknut 13 becomes uniform, and no torsional force due to a rotation is transmitted to the taper collet 12. Consequently, the tapered portion 122 of the taper collet 12 can be securely inserted into the tapered hole 114 without inclination, in a manner following a taper of the tapered hole 114, and moreover, a twisting of the taper collet during tightening of the locknut is eliminated.

Accordingly, in the tool holder according to the first embodiment, a cutting tool can be held in the collet chuck body 11 without inclining the taper collet 12, and rotation run-out of the cutting tool 15 grasped and held by the taper collet 12 can be eliminated, and the tool holder can be preferably used as 2 a tool holder using a small-sized collet, and therefore, the problem of deterioration of the cutting accuracy of the workpiece is addressed.

In addition, in the tool holder according to the first embodiment, since the bearing washer 14 is interposed between the reference end 123 of the taper collet 12 and the collet supporting portion 131 of the locknut 13, twisting of the taper collet 12 during tightening of the locknut 13 is eliminated, whereby run-out accuracy of the taper collet 12 can further be improved.

Next, a second embodiment of a bearing washer holding means in a tool holder of the present invention will be described with reference to FIG. 3.

Figure 3:
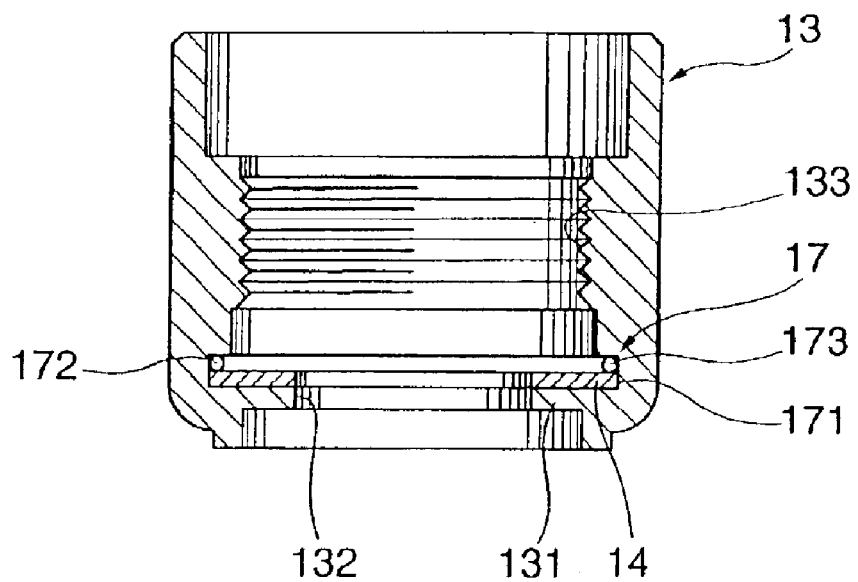
FIG. 3 is a longitudinal side view of a locknut and a bearing washer holding mechanism portion showing a second embodiment of a bearing washer holding means in a tool holder of the present invention.

FIG. 3 is a longitudinal side view of a locknut and a bearing washer holding mechanism portion showing the second embodiment of a bearing washer holding means in a tool holder of the present invention.

In this FIG. 3, identical reference numerals are used for components identical to those of FIG. 1, FIG. 2A, and FIG. 2B, description of the construction thereof is omitted, while differences from FIG. 1, FIG. 2A, and FIG. 2B will be selectively described.

In this embodiment, a difference from FIG. 1, FIG. 2A, and FIG. 2B exists in the holding means 17 of the bearing washer 14.

The holding means 17 comprises a ring-like holding groove 171 formed on the inner circumferential surface of a locknut 13 so as to hold a bearing washer 14 in contact with a collet supporting portion 131 of the locknut 13, a ring-like engaging groove 172 formed on the inner circumference of the locknut 13, adjacent to the holding groove 171, and a snap ring 173 which is disengageably attached by insertion in the latching groove and which holds the bearing washer 14 in the holding groove 171.

In this second embodiment, since the bearing washer 14 inserted in the ring-like holding groove 171 is held in the locknut 13 by the snap ring 173 which is disengageably attached by insertion in the engaging groove 172, an attachment of the bearing washer 14 to the inside of the locknut 13 and a detachment of the bearing washer 14 from the locknut 13 can be easily carried out.

Now, a modification of a locknut in a tool holder of the present invention will be described with reference to FIG. 4.

Figure 4:
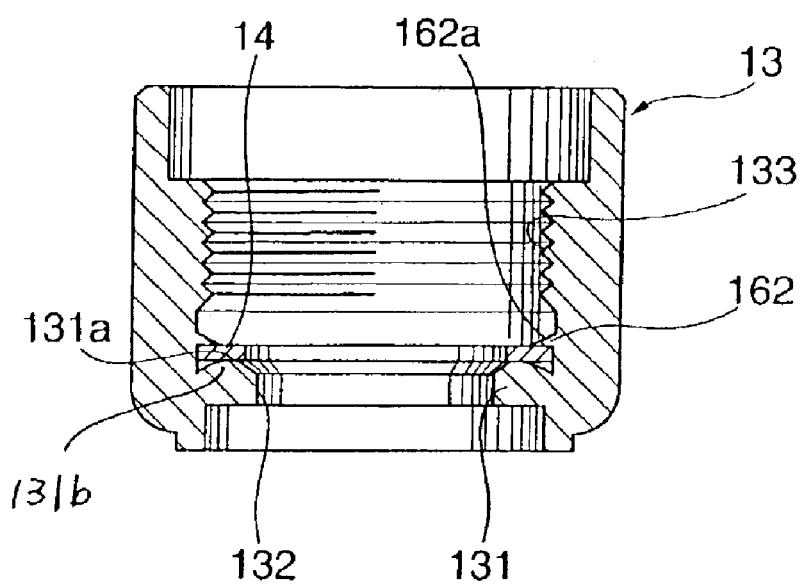
FIG. 4 is a longitudinal side view of a modification of a locknut in a tool holder according to the present invention.

FIG. 4 is a longitudinal section view showing a modification of a locknut in a tool holder according to the present invention.

In this FIG. 4, identical symbols are used for components identical to those of FIG. 1, FIG. 2A, and FIG. 2B, description of the construction thereof is omitted, while differences from FIG. 1, FIG. 2A, and FIG. 2B will be selectively described.

In the locknut 13 shown in this embodiment, a difference from FIG. 1, FIG. 2A, and FIG. 2B exists in that a surface 131a of a collet supporting portion 131 of a locknut 13 with which a bearing washer 14 comes into contact is formed on an arc surface 131b which is protruded in a convex shape toward the convex thread portion 162.

According to such an embodiment, since the surface 131a of the collet supporting portion 131 of the locknut 13 with which the bearing washer 14 comes into contact is formed on the arc surface 131b which is protruded in a convex shape toward the convex thread portion 162, a contact area between the bearing washer 14 and collet supporting portion 131 is reduced, whereby the frictional resistance between the bearing washer 14 and collet supporting portion 131 can further be reduced.

Now, still another embodiment of a bearing washer holding means in the tool holder of the present invention will be described based on FIG. 5 and FIG. 6.

Figure 5:
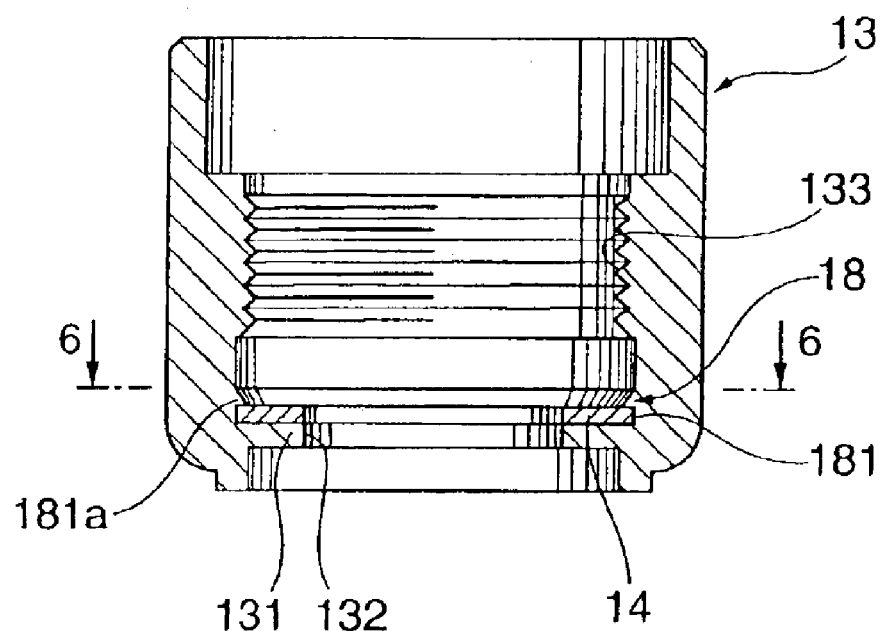
FIG. 5 is a longitudinal side view of a locknut and a bearing washer holding mechanism portion showing a third embodiment of a bearing washer holding means in a tool holder of the present invention.

FIG. 5 is a longitudinal side view of a locknut and a bearing washer holding mechanism portion showing a third embodiment of a bearing washer holding means in a tool holder of the present invention.

Figure 6:
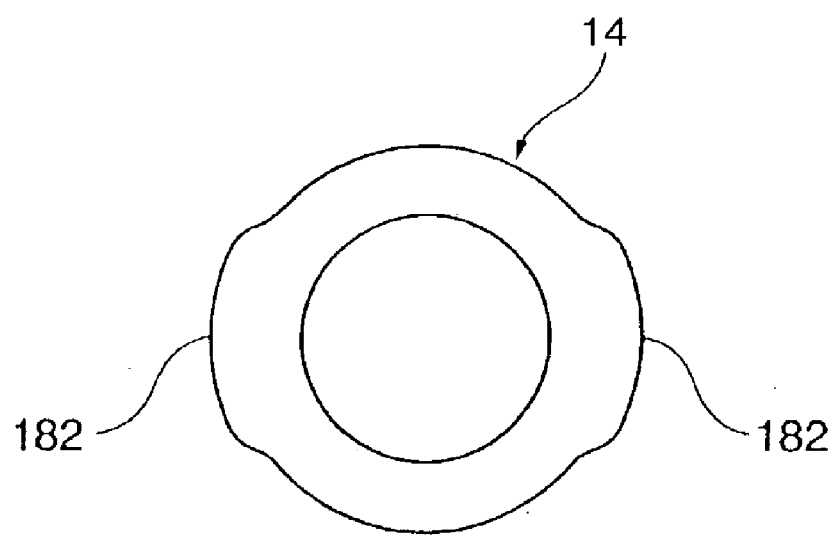
FIG. 6 is a plan view of a bearing washer according to the third embodiment of the present invention.

FIG. 6 is a plan view of a bearing washer according to the third embodiment of the present invention.

In FIG. 5 and FIG. 6, identical symbols are used for components identical to those of FIG. 1, FIG. 2A, and FIG. 2B, description of the construction thereof is omitted, while differences from FIG. 1, FIG. 2A, and FIG. 2B will be selectively described.

In this embodiment, a difference from FIG. 1, FIG. 2A, and FIG. 2B exists in the holding means 18 of the bearing washer 14.

The holding means 18 comprises a ring-like holding groove 181 formed on the inner circumferential surface of a locknut 13 so as to hold a bearing washer 14 in contact with a collet holding portion 131 of a locknut 13, and, at two marginal parts of the bearing washer separated by 180 degrees in the circumferential direction, a plurality of protrusions 182 are formed across an angle of approximately 90 degrees so as to protrude outward from the margin of the bearing washer 14 and are disengageably engaged with the holding groove 181.

Then, the outside diameter of the bearing washer 14 excluding the protrusions 182 is equivalent to the inside diameter of a convex thread portion 181a of the holding groove 181. In addition, the counter-collet supporting portion side surface of the convex thread portion 181a has an inclined shape so that the thickness of the convex thread portion 181a is gradually thinned from the inner circumferential surface of the locknut 13 toward the center direction.

In the third embodiment having such a holding means 18, by disengageably engaging the plurality of protrusions 182 that is provided in a protruded manner from the margin of the bearing washer 14 with the holding groove 181, the bearing washer 14 can be held in the locknut 13, therefore, an attachment of the bearing washer 14 to the inside of the locknut 13 and a detachment of the bearing washer 14 from the locknut 13 can be easily carried out.

Now, a fourth embodiment of a holding means for a bearing washer in a tool holder of the present invention will be described based on FIG. 7 and FIG. 8.

Figure 7:
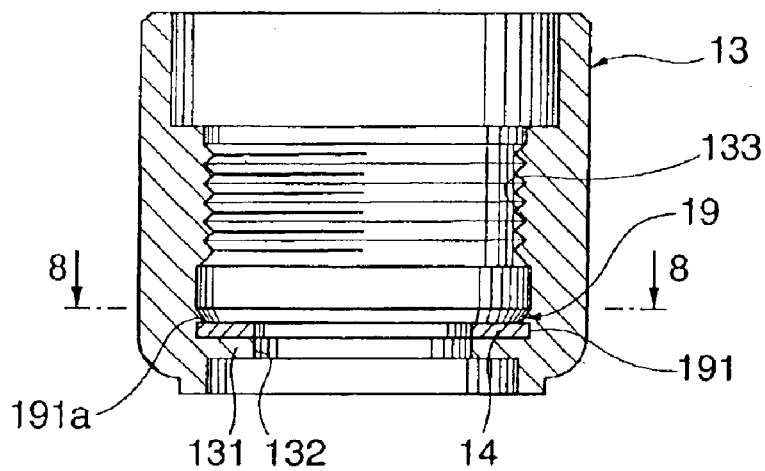
FIG. 7 is a longitudinal side view of a locknut and a bearing washer holding mechanism portion showing a fourth embodiment of a bearing washer holding means in a tool holder of the present invention.
Figure 8:
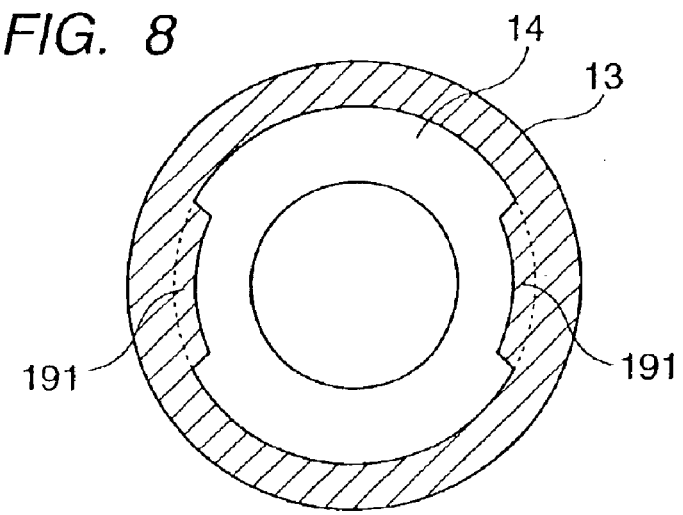
FIG. 8 is a transverse plan view along the 8—8 line of FIG. 7.

FIG. 7 is a longitudinal side view of a locknut and a bearing washer holding mechanism portion showing the fourth embodiment of a bearing washer holding means in a tool holder of the present invention, and FIG. 8 is a transverse plan view along the 8—8 line of FIG. 7.

In FIG. 7 and FIG. 8, identical symbols are used for components identical to those of FIG. 1, FIG. 2A, and FIG. 2B, description of the construction thereof is omitted, while differences from FIG. 1, FIG. 2A, and FIG. 2B will be selectively described.

In the fourth embodiment, a difference from FIG. 1, FIG. 2A, and FIG. 2B exists in the holding means 19 of the bearing washer 14.

In order to hold the bearing washer 14 in contact with the collet supporting portion 131 of the locknut 13, the holding means 19 has, at two parts of the inner circumferential surface separated by 180 degrees in the inner circumferential direction of the locknut 13, a plurality of holding protrusions 191 formed with a ring-like layout so as to protrude from the inner circumferential surface toward the center direction, and by engaging the outer circumferential rim of the bearing washer 14 with these holding protrusions 191, the bearing washer 14 is detachably held in the locknut 13.

A counter-collet supporting portion-side surface 191a of the holding protrusions 191 has an inclined shape so that the thickness of the holding protrusions 191 is gradually thinned from the inner circumferential surface of the locknut 13 toward the center direction.

In the fourth embodiment having such a holding means 19, by disengageably engaging the marginal portion of the bearing washer 14 with the plurality of holding protrusions 191 formed with a ring-like layout on the inner circumferential surface of the locknut 13, the bearing washer 14 can be held in the locknut 13, therefore, an attachment of the bearing washer to the inside of the locknut 13 and a detachment of the bearing washer 14 from the locknut 13 can be easily carried out.

Now, another embodiment of a bearing washer in a tool holder of the present invention will be described based on FIG. 9.

Figure 9:
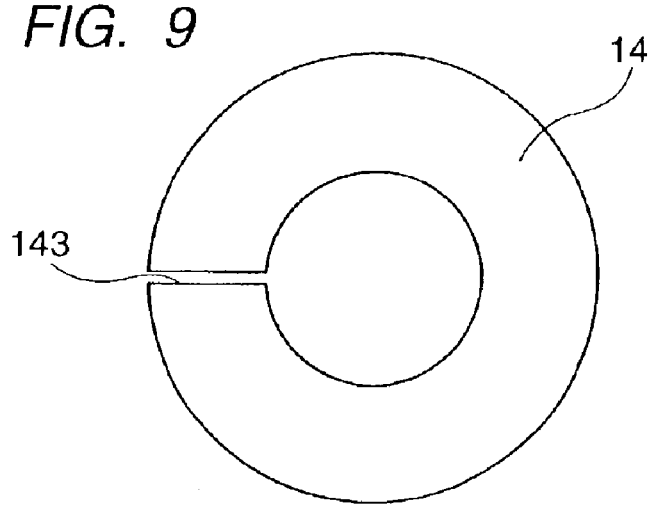
FIG. 9 is a plan view showing another embodiment of a bearing washer in a tool holder of the present invention.

FIG. 9 is a plan view showing another embodiment of a bearing washer in a tool holder of the present invention.

In this FIG. 9, a difference from the above embodiment exists in that a slot 143 for a diameter reduction is formed in the radial direction in a bearing washer 14.

According to such an embodiment, since the slit 143 is formed in the bearing washer 14, by pressing the whole bearing washer 14 against the inclined surface of the convex thread portion 162 after placing the bearing washer 14 on the inclined surface of the convex protruded portion 162 in the locknut 13, the bearing washer 14 can be easily fitted to the holding groove 161 of the locknut 13 while the diameter is reduced.

In the above embodiment, a description has been given in a case where surface treatment for a frictional resistance reduction is applied to both surfaces of the bearing washer 14 which comes in contact with the reference end 123 of the taper collet 12 and collet supporting portion 131 of the lock nut 13, however, the present invention is not limited hereto and surface treatment for a frictional resistance reduction may be applied at least to the surface of the bearing washer 14 which comes in contact with the collet supporting portion 131 of the locknut 13.

What is claimed is:

1. A tool holder comprising: a collet chuck body; a slotted taper collet to be fitted in a tapered hole formed in the front-end portion of said collet chuck body; a locknut which is screwed with a male screw portion formed on the outer circumference of the front-end portion of said collet chuck body and which hold a cutting tool by inserting said taper collet into said tapered hole, wherein said taper collet has, at the front end of the cutting tool inserting side thereof, a reference end perpendicular to the axis line of the taper collet and a cylindrical nut engaging portion protruded from said reference end with its axis line aligned, said locknut has a collet supporting portion formed in a manner protruding in the center direction of the locknut so as to be opposed to said reference end and an insertion hole concentrically formed in the center of said collet supporting portion so a to allow an insertion of said nut engaging portion, said taper collet has a brim portion which is formed on the outer circumference of the front end of said nut engaging portion inserted through said insertion hole and which couples, by latching with a marginal rim of said insertion hole, said taper collet to said locknut so as to be relatively rotatable, a metal ring plate-like bearing washer is interposed between said reference end and said collet supporting portion opposed thereto, and to at least one surface of said bearing washer which comes into contact with said reference end and said collet supporting portion, surface treatment to reduce frictional resistance between both contact surfaces is applied.

2. The tool holder as set forth in claim 1, wherein said bearing washer has a slot for a diameter reduction formed in the radial direction thereof.

3. The tool holder as set forth in claim 1, wherein surface treatment of said bearing washer is any of ion nitriding, DLC (Diamond-Like Carbon) coating, TiN coating process, and mirror-surface lapping.

4. The tool holder as set forth in claim 1, wherein said locknut comprises a holding means for detachably holding said bearing washer in said locknut.

5. The tool holder as set forth in claim 4, wherein said holding means has a ring-like holding groove which is formed on the inner circumferential surface of said locknut so as to hold said bearing washer in contact with said collet supporting portion, and by engaging said outer circumferential rim portion with this holding groove, said bearing washer is held in said locknut.

6. The tool holder as set forth in claim 4, wherein said holding means has a ring-like holding groove formed on the inner circumferential surface of said locknut so as to hold said bearing washer in contact with said collet supporting portion and a plurality of protrusions which are formed on the margin of said bearing washer so as to protrude outward from the margin of the bearing washer and which are disengageably engaged with said holding groove.

7. The tool holder as set forth in claim 5, wherein said holding groove is composed of a convex thread portion formed in a ring shape on the inner circumferential surface of said locknut at an appointed distance corresponding to the thickness of said bearing washer from said collet supporting portion, and a surface on the counter-collet holding portion side of this convex thread portion is inclined so that the thickness of this convex thread portion is gradually thinned from the inner circumferential surface of said locknut toward the center direction.

8. The tool holder as set forth in claim 4, wherein said holding means has, in order to hold said bearing washer in contact with said collet supporting portion, a plurality of holding protrusions formed with a ring-like layout so as to protrude from the inner circumferential surface toward the center direction, and by engaging the outer circumferential rim portion of said bearing washer with these holding protrusions, the bearing washer is detachably held in said locknut.

9. The tool holder as set forth in claim 8, wherein the surface on the counter-collet supporting portion side of said holding protrusions are inclined so that the thickness of the holding protrusions is gradually thinned from the inner circumferential surface of said locknut toward the center direction.

10. The tool holder as set forth in claim 4, wherein said holding means comprises a ring-like holding groove formed on the inner circumferential surface of said locknut so as to hold said bearing washer in contact with said collet supporting portion, an engaging groove formed in a ring shape on the inside of said locknut, adjacent to said holding groove, and a snap ring which is disengageably attached by insertion in this engaging groove and which holds said bearing washer in said holding groove.

11. The tool holder as set forth in claim 5, wherein a surface of said collet supporting portion to which said bearing washer comes into contact is a convex arc surface.

12. The tool holder as set forth in claim 2, wherein surface treatment of said bearing washer is any of ion nitriding, DLC (Diamond-Like Carbon) coating, TiN coating process, and mirror-surface lapping.

13. The tool holder as set forth in claim 2, wherein said locknut comprises a holding means for detachably holding said bearing washer in said locknut.

14. The tool holder as set forth in claim 6, wherein said holding groove is composed of a convex thread portion formed in a ring shape on the inner circumferential surface of said locknut at an appointed distance corresponding to the thickness of said bearing washer from said collet supporting portion, and a surface on the counter-collet holding portion side of this convex thread portion is inclined so that the thickness of this convex thread portion is gradually thinned from the inner circumferential surface of said locknut toward the center direction.

15. The tool holder as set forth in claim 6, wherein a surface of said collet supporting portion to which said bearing washer comes into contact is a convex arc surface.

16. The tool holder as set forth in claim 8, wherein a surface of said collet supporting portion to which said bearing washer comes into contact is a convex arc surface.

17. The tool holder as set forth in claim 10, wherein a surface of said collet supporting portion to which said bearing washer comes into contact is a convex arc surface.

18. A tool holder comprising:

a collet chuck body;

a slotted, tapered collet for holding a cutting tool, said tapered collet being received in a tapered hole formed in a front end portion of said collet chuck body;

a locknut in screw-engagement with an outer circumference of the front end portion of said collet chuck body, said locknut being rotatable so as to press said tapered collet toward the interior of the tapered hole to thereby cause said tapered collet to hold the cutting tool, wherein said tapered collet has, near a front face thereof through which the cutting tool is inserted into said tapered collet, a circumferential groove formed on a circumferential surface of said tapered collet, a rear-side side wall surface of the circumferential groove serving as a reference end surface;

said locknut has an annular collet-supporting portion projecting radially inward from an inner circumferential surface of said locknut and received in the circumferential groove of said tapered collet so that said locknut is rotatably engaged with said tapered collet;

a flat, ring-shaped bearing washer is interposed between said reference end surface and said collet-supporting portion; and at least one of opposite contact surfaces of said bearing washer which come into contact with said reference end surface and said collet supporting portion, respectively, is treated so as to reduce frictional resistance thereof.

19. The tool holder as set forth in claim 18, wherein said bearing washer has a radially extending slot which allows said bearing washer to be reduced in diameter.

20. The tool holder as set forth in claim 19, wherein the contact surface of said bearing washer is surface-treated by ion nitriding, DLC (Diamond-Like Carbon) coating, TiN coating, or mirror-surface lapping.

21. The tool holder as set forth in claim 19, wherein said locknut comprises holding means for detachably holding said bearing washer in said locknut.

22. The tool holder as set forth in claim 18, wherein the contact surface of said bearing washer is surface-treated by ion nitriding, DLC (Diamond-Like Carbon) coating, TiN coating, or mirror-surface lapping.

23. The tool holder as set forth in claim 18, wherein said locknut comprises holding means for detachably holding said bearing washer in said locknut.

24. The tool holder as set forth in claim 23, wherein said holding means comprises a circumferential holding groove formed on an inner circumferential surface of said locknut, the holding groove holding a peripheral edge portion of said bearing washer so as to hold said bearing washer in said locknut.

25. The tool holder as set forth in claim 24, wherein said locknut has a circumferential projection partially defining said holding groove, said circumferential projection extending radially inward from an inner circumferential surface of said locknut and having a thickness decreasing toward a center axis of said locknut.

26. The tool holder as set forth in claim 25, wherein a surface of said collet-supporting portion, the surface being in contact with said bearing washer, has a convex arcuate radial cross section.

27. The tool holder as set forth in claim 24, wherein a surface of said collet-supporting portion, the surface being in contact with said bearing washer, has a convex arcuate radial cross section.

28. The tool holder as set forth in claim 23, wherein said holding means comprises a circumferential holding groove which is formed on an inner circumferential surface of said locknut, and a plurality of protrusions projecting from a peripheral edge of said bearing washer and removably received by said circumferential holding groove.

29. The tool holder as set forth in claim 23, wherein said holding means comprises a plurality of protrusions arranged at predetermined circumferential intervals on an inner circumferential surface of said locknut, the protrusions extending radially inward from the inner circumferential surface of said locknut toward a center axis of said locknut and being engageable with a peripheral edge portion of said bearing washer so as to removably hold said bearing washer in said locknut.

30. The tool holder as set forth in claim 29, wherein a surface of each of said protrusions opposite said collet-supporting portion is formed so that each of said protrusions has a thickness decreasing toward the center axis of said locknut.

31. The tool holder as set forth in claim 30, wherein a surface of said collet-supporting portion, the surface being in contact with said bearing washer, has a convex arcuate radial cross section.

32. The tool holder as set forth in claim 29, wherein a surface of said collet-supporting portion, the surface being in contact with said bearing washer, has a convex arcuate radial cross section.

33. The tool holder as set forth in claim 23, wherein said holding means comprises a circumferential holding groove formed on an inner circumferential surface of said locknut; an engagement groove formed on the inner circumferential surface of said locknut adjacent to said holding groove; and a snap ring removably placed in said engagement groove so as to hold said bearing washer in said holding groove.

* * * * *